United States Patent [19]
Demaio

[11] Patent Number: 5,625,974
[45] Date of Patent: May 6, 1997

[54] PORTABLE, DOCK-MOUNTED FISHING POLE HOLDER

[76] Inventor: Dominic A. Demaio, 1969 Little Meadow Rd., Guilford, Conn. 06437

[21] Appl. No.: 518,432

[22] Filed: Aug. 23, 1995

[51] Int. Cl.⁶ .................................................. A01K 97/10
[52] U.S. Cl. .................................. 43/21.2; 248/538
[58] Field of Search ................... 43/21.2; 248/520, 248/538

[56] References Cited

U.S. PATENT DOCUMENTS

| | | | |
|---|---|---|---|
| 1,967,427 | 7/1934 | Puckett | 248/538 |
| 2,033,007 | 3/1936 | Raithel | 248/538 |
| 2,265,330 | 12/1941 | Waddle | 248/538 |
| 2,912,196 | 11/1959 | Johnson | 248/538 |
| 2,952,432 | 9/1960 | Valdez | 248/538 |
| 3,259,346 | 7/1966 | Rogers | 248/538 |
| 4,235,409 | 11/1980 | Cummings | 248/520 |
| 4,803,794 | 2/1989 | Lopez | 43/21.2 |
| 4,835,896 | 6/1989 | Bowen | 43/21.2 |
| 4,852,290 | 8/1989 | Wallace | 43/21.2 |

*Primary Examiner*—Kurt Rowan
*Attorney, Agent, or Firm*—M. P. Williams

[57] ABSTRACT

A fishing pole holder shell is attached to a stem that extends between the planks of a dock with a cross piece supporting the stem against the upper surface of the dock and either a cross piece or a bent portion supporting the stem against the bottom surface of the dock.

11 Claims, 3 Drawing Sheets

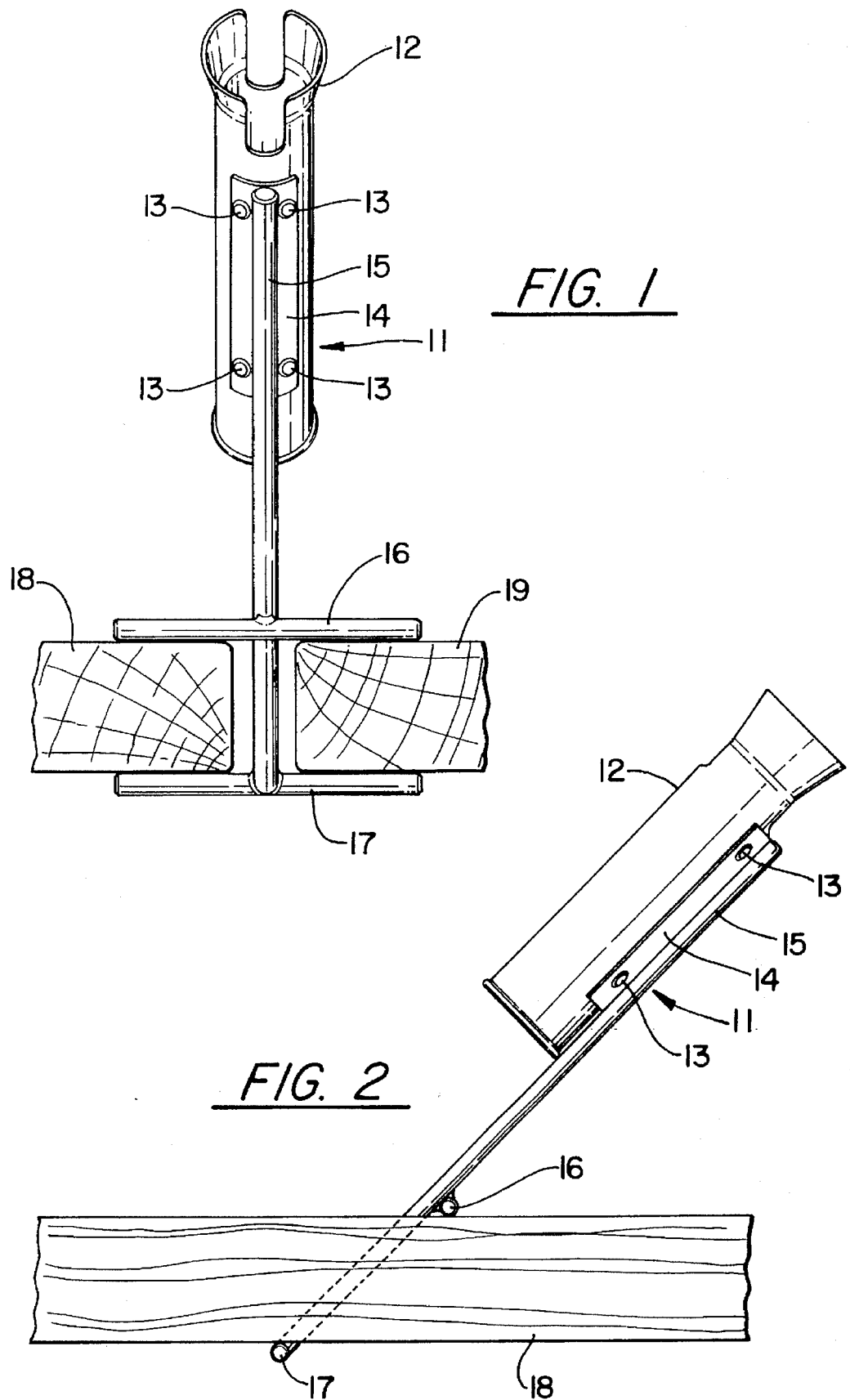

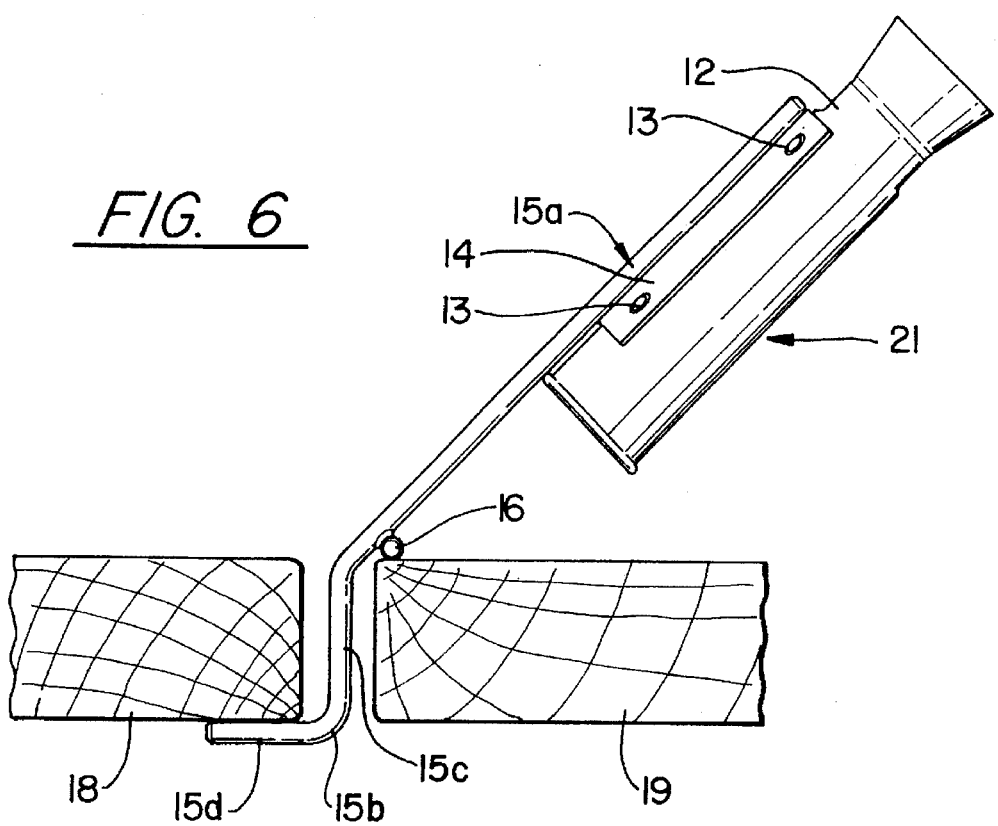
FIG. 6
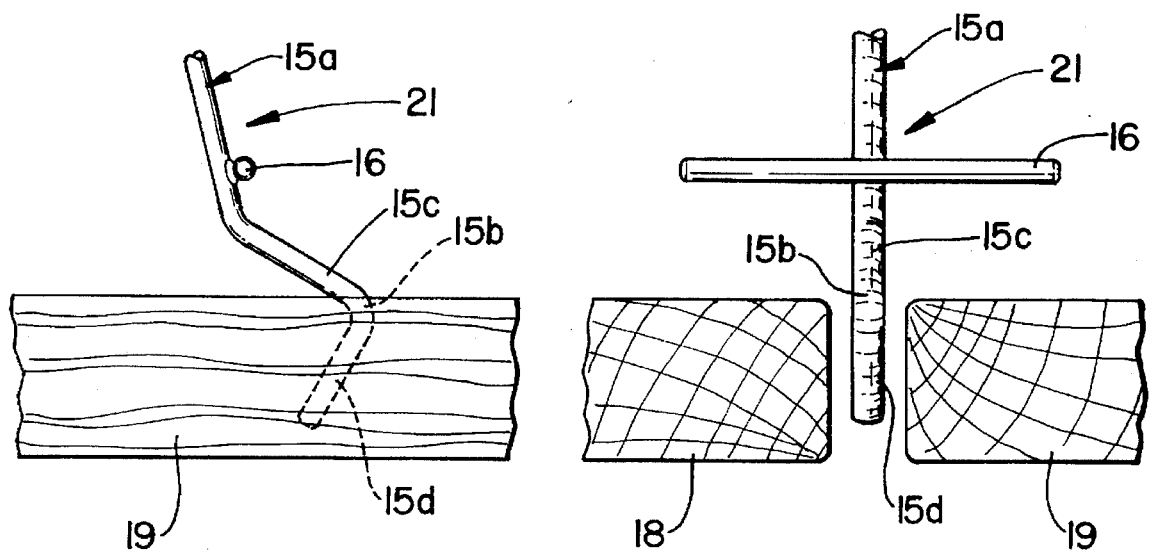
FIG. 7
FIG. 8

PORTABLE, DOCK-MOUNTED FISHING POLE HOLDER

TECHNICAL FIELD

This invention relates to a fishing pole holder which is readily mounted between the planks of a dock.

BACKGROUND ART

Sport fishing catalogs and showrooms are replete with fishing pole holders that may be temporarily clamped to boat or other railings, as well as fishing pole holders to be fastened to boats in a variety of ways. None of these, however, serve the need of a day fisherman who visits one or more docks. Such activity requires an easily mounted and demounted, portable fishing pole holder; particularly, one which may be readily used with common docks.

DISCLOSURE OF INVENTION

Objects of the invention include provision of a portable fishing pole holder which is easily used with planked docks.

According to the invention, a fishing pole holder is mounted to a stem which may be inserted between the planks of a dock, and then rotated, with suitable cross pieces and shaping to cause the dock to support the fishing pole holder at a suitable angle for fishing. One embodiment uses two cross pieces for supporting the fishing pole holder when fishing in a direction aligned with the planking of the dock. Another embodiment utilizes a cross piece and a suitably bent stem for fishing in a direction which is transverse to the planking of a dock. Various materials of various shapes may be used.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a partial, partially sectioned side elevation view of a dock with a fishing pole holder of the invention installed thereon.

FIG. 2 is an end elevation view of the fishing pole holder and dock of FIG. 1.

FIG. 6 is a partial, partially sectioned side elevation view of the dock and fishing pole holder of FIG. 5.

FIG. 7 is an end elevation view of the fishing pole holder of FIG. 5 being inserted into the dock.

FIG. 8 is a partial, partially sectioned side elevation view of the fishing pole holder and dock of FIG. 7.

BEST MODE FOR CARRYING OUT THE INVENTION

Figures 3, 4:
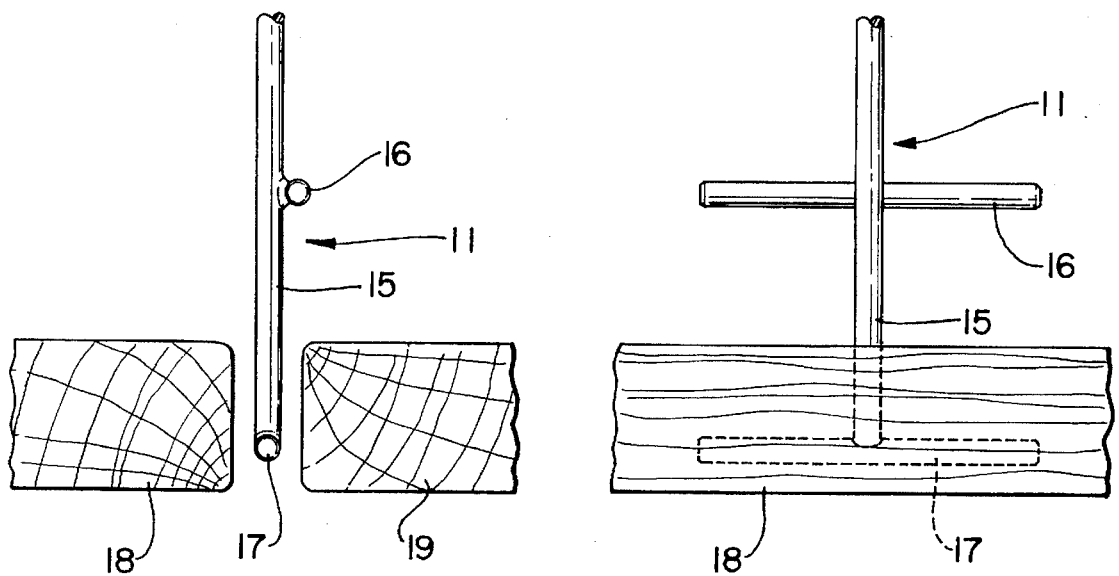
FIG. 3 is a partial, partially sectioned side elevation view of the fishing pole holder of FIG. 1 being inserted into the dock.
FIG. 4 is an end elevation view of the dock and fishing pole holder of FIG. 3.

Referring now to FIG. 1, a fishing pole holder 11 includes a shell 12, of the type that is readily available in sports catalogs and showrooms, fastened by pop rivets 13 to an arcuate strip of sheet metal 14 which is spot welded to a metal stem 15. The stem 15 has two cross pieces 16, 17 spot welded thereto. The portion of the stem 15 between the cross pieces 16, 17 fits between planks 18, 19 of a dock, or the like. The cross pieces 16, 17 provide vertical support to the stem 15, as seen in FIG. 2, thereby to hold the fishing pole holder 11 at a suitable angle to suspend a fishing pole properly for use. In a typical dock where the planks 18, 19 run laterally (from side to side) the fishing pole holder shown in FIGS. 1 and 2 is set up to fish off the side of the dock.

The fishing pole holder of FIGS. 1 and 2 is readily inserted into the dock by aligning the cross pieces 16, 17 parallel with the planks 18, 19, inserting the cross piece 17 in the space between the planks 18 and 19 as seen in FIGS. 3 and 4, and moving the cross bar 17 downwardly until it is beneath the planks 18, 19; thereafter, the fishing pole holder 11 is rotated a quarter of a turn so that the cross bar 17 spans the space between the planks 18, 19, and the fishing pole holder 11 is tilted toward the area to be fished as seen in FIG. 2.

To fish off the end of a dock, the embodiment of FIGS. 5-8 has a stem 15a with only one cross piece 16 and a right angle bend 15b (FIG. 6) with a vertical portion 15c that extends between the planks 18, 19 and a horizontal portion 15d that engages the underside of the plank 18 to provide support. The vertical portion 15c may be at an angle, such as 45°, with respect to the main portion of the stem 15a to which the shell 12 is fastened, such as 45°, but it may be between 20° and 80° or at any other desired angle. To establish such an angle, the distance between the cross pieces 16, 17 (or the length of the vertical portion 15c) may be from 1¼ the thickness of the planks 18, 19 for large angles (about 70°), to 1½ the plank thickness for medium angles (about 45°) to 2½ the thickness for low angles (about 20°), or otherwise. As an example, a 2" spacing will yield an angle of about 30° on a dock with 1" thick planking and an angle of about 50° on a dock with 1½" thick planking (that is, 2-by-6, etc.).

Figure 5:
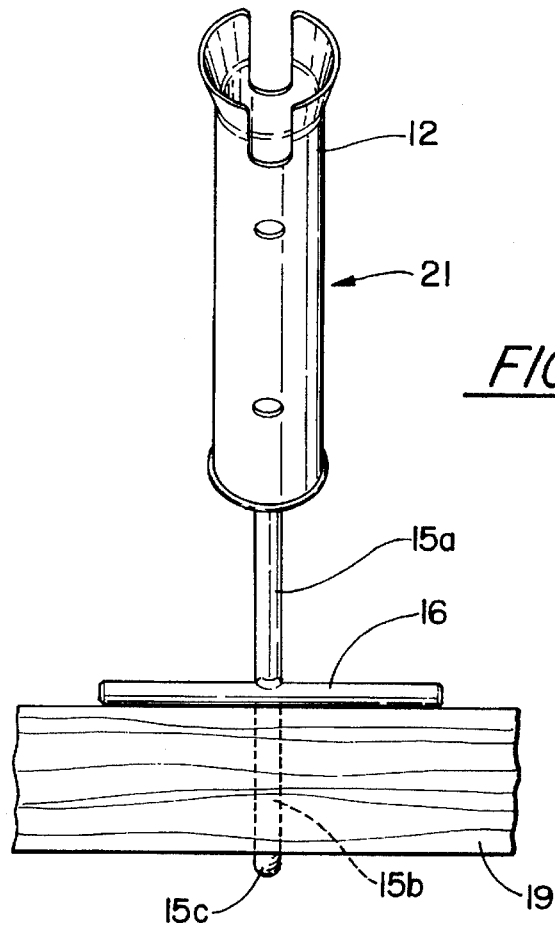
FIG. 5 is a partial end elevation view of a dock with a second embodiment of the invention installed therein.

To install the fishing pole holder 21 into the dock, it is placed with the cross piece 16 substantially perpendicular to the planks 18, 19 and the portion 15c, 15d is lowered through the space between the planks 18 and 19, and then the fishing pole holder 21 is rotated a quarter turn to place it in a position shown in FIGS. 5 and 6.

The cross piece 16 can be eliminated from the fishing pole holder 21, relying on the vertical portion 15c, and/or the portion of the stem 15 adjacent thereto, for support. This embodiment is more nearly two-dimensional, and easier to store and transport. The cross piece 16 could be parallel to the portion 15d.

The stem 15, 15a and cross pieces 16, 17 may be formed of 5/16 inch steel rod, rods of other dimensions and materials, round or square tubes of metal and plastic, or otherwise. The stem and cross pieces can be made in shapes and of materials that differ from each other, and may be joined together by any suitable means.

The length of the stem 15, 15a between the cross piece 16 and the shell 12 need only be enough for clearance of the shell 12 with respect to the planks 18, 19 (e.g., see FIG. 6); it may be as long as desired.

The shell 12 may be secured to the stem 15, 15a in any other suitable way. Fasteners other than pop rivets 13 may be used, or the shell may be bonded to the strip 14, with any suitable adhesive material. The strip 14 may be bolted, riveted or bonded to the stem 15, 15a by other than welding. The shell 12 may be secured directly to the stem 15, 15a by bonding or by means of suitable fasteners. The shell 12 may be of any suitable material. The shell may be formed in one piece with the stem or other support. The stem 16 could be replaced by a collar or other shape of protuberance from the stem 15, 15a. Either cross piece 16, 17 could extend to only one side of the stem 15, 15a, but the holder would be less stable in that case.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A portable fishing pole holder for holding, on a dock comprising planks with spaces therebetween, a fishing pole having a tip end, from which fishing line extends into the water to be fished, and having a handle end, comprising:

a fishing pole holder shell having a distal end into which the handle end of a fishing pole may be inserted for support thereby and a proximal end opposite from said distal end;

a stem attached to said shell along a length of said stem near a first end of said stem, said stem extending from the proximal end of said shell;

a first cross piece disposed on said stem transversely of said stem near a second end of said stem opposite from said first end, for contacting the bottom of a pair of planks of the dock; and a second cross piece disposed on said stem substantially transversely of said stem and substantially parallel with said first cross piece and separated therefrom by a distance on the order of between 1¼ and 2½ times the thickness of the planks on a dock with which said holder is to be used, whereby said holder may have its cross pieces aligned with a space between the planks of the dock, be lowered to a point where said first cross piece is below the planks and said second cross piece is above the planks, said holder may then be rotated about a quarter turn to position said cross pieces substantially transversely to the planks and then tilted to place said shell at a fishing angle, supported by said cross pieces engaging the planks.

2. A holder according to claim 1 wherein said stem comprises a steel rod.

3. A holder according to claim 1 wherein one of said cross pieces comprises a steel rod.

4. A portable fishing pole holder for holding, on a dock comprising planks with spaces therebetween, a fishing pole having a tip end, from which fishing line extends into the water to be fished, and having a handle end, comprising:

a fishing pole holder shell having a distal end into which the handle end of a fishing pole may be inserted for support thereby and a proximal end opposite from said distal end; and a stem attached to said shell along a first portion of said stem near a first end of said stem, said stem extending from the proximal end of said shell, said stem having a substantially right angle bend formed therein to provide a horizontal portion near a second end of said stem opposite from said first end and a vertical portion, said vertical portion at a first angle, suitable for fishing, with respect to said shell, said vertical portion extending between said horizontal portion and said first angle, said vertical portion having a length on the order of but greater than the thickness of the planks on a dock with which said holder is to be used, whereby said holder may have its right angle bend aligned with and inserted into a space between the planks of the dock to a point where said horizontal portion is below the planks and said first angle is above the planks, said holder may then be rotated about a quarter turn to position said horizontal portion substantially transversely to the planks, thereby placing said shell at a fishing angle, supported by said horizontal portion engaging the underside of the planks.

5. A holder according to claim 4 including a protuberance disposed on said stem near said first angle and having a component transverse to said vertical portion.

6. A holder according to claim 5 wherein said protuberance comprises a cross piece transverse to said horizontal portion.

7. A holder according to claim 6 wherein said cross piece comprises a steel rod.

8. A holder according to claim 4 wherein said stem comprises a steel rod.

9. A holder according to claim 4 wherein said vertical portion is at an obtuse angle with respect to said shell.

10. A holder for holding, on a dock comprising planks with spaces therebetween, a fishing pole having a tip end, from which fishing line extends into the water to be fished, and having a handle end, comprising:

a fishing pole holder shell having a distal end into which the handle end of a fishing pole may be inserted for support thereby and a proximal end opposite from said distal end; and a support, said shell disposed on a first end of said support, said support having a bottom portion for engaging a bottom surface of a first plank of the dock when oriented substantially perpendicularly to a first space adjacent to said first plank and for sliding into said first space when oriented substantially parallel thereto; said support comprising:

a stem, said shell attached to said stem near said first end of said stem, said stem extending from the proximal end of said shell;

a first cross piece disposed on said stem transversely of said stem near a second end of said stem opposite from said first end, for contacting the bottom of a pair of planks of the dock; and a second cross piece disposed on said stem substantially transversely of said stem and substantially parallel with said first cross piece and separated therefrom by a distance on the order of between 1¼ and 2½ times the thickness of the planks on a dock with which said holder is to be used, whereby said holder may have its cross pieces aligned with a space between the planks of the dock, be lowered to a point where said first cross piece is below the planks and said second cross piece is above the planks, said holder may then be rotated about a quarter turn to position said cross pieces substantially transversely to the planks and then tilted to place said shell at a fishing angle, supported by said cross pieces engaging the planks.

11. A holder for holding, on a dock comprising' planks with spaces therebetween, a fishing pole having a tip end, from which fishing line extends into the water to be fished, and having a handle end, comprising:

a fishing pole holder shell having a distal end into which the handle end of a fishing pole may be inserted for support thereby and a proximal end opposite from said distal end; and a support, said shell disposed on a first end of said support, said support having a bottom portion for engaging a bottom surface of a first plank of the dock when oriented substantially perpendicularly to a first space adjacent to said first plank and for sliding into said first space when oriented substantially parallel thereto; said support comprising:

a stem attached to said shell along a first portion of said stem near a first end of said stem, said stem extending from the proximal end of said shell, said stem having a substantially right angle bend formed therein to provide a horizontal portion near a second end of said stem opposite from said first end and a vertical portion, said vertical portion at a first angle, suitable for fishing, with respect to said shell, said vertical portion extending between said horizontal portion and said first angle, said vertical portion having a length on the order of but greater than the thickness of the planks on a dock with which said holder is to be used, whereby said holder may have its right angle bend aligned with and inserted into a space between the planks of the dock to a point where said horizontal portion is below the planks and said first angle is above the planks, said holder may then be rotated about a quarter turn to position said horizontal portion substantially transversely to the planks, thereby placing said shell at a fishing angle, supported by said horizontal portion engaging the underside of the planks.

* * * * *